(12) United States Patent
Pottmann

(10) Patent No.: US 8,205,513 B2
(45) Date of Patent: Jun. 26, 2012

(54) CLOSURE DEVICE AND METHOD FOR OPERATING THE CLOSURE DEVICE

(75) Inventor: Manfred Pottmann, Remscheid (DE)

(73) Assignee: FLSmidth A/S (DK)

( * ) Notice: Subject to any disclaimer, the term of this patent is extended or adjusted under 35 U.S.C. 154(b) by 125 days.

(21) Appl. No.: 12/536,569

(22) Filed: Aug. 6, 2009

(65) Prior Publication Data

US 2009/0293648 A1   Dec. 3, 2009

Related U.S. Application Data

(63) Continuation of application No. PCT/EP2008/051253, filed on Feb. 1, 2008.

(30) Foreign Application Priority Data

Feb. 6, 2007  (DE) .......................... 10 2007 005 820

(51) Int. Cl.
G01N 1/20   (2006.01)
(52) U.S. Cl. ................ 73/864.63; 73/864.34; 73/863.71
(58) Field of Classification Search ............... 73/864.34, 73/863.71
See application file for complete search history.

(56) References Cited

U.S. PATENT DOCUMENTS

| | | | | |
|---|---|---|---|---|
| 2,805,836 A * | 9/1957 | Taylor | ........................... | 251/177 |
| 4,060,183 A * | 11/1977 | Puurunen | ...................... | 222/442 |
| 4,497,264 A * | 2/1985 | Pickett et al. | ................... | 111/73 |
| 4,524,796 A * | 6/1985 | Ayers et al. | ................... | 137/240 |
| 6,590,352 B1 * | 7/2003 | Wang | ............................. | 315/364 |
| 2005/0284461 A1 * | 12/2005 | Hsu | ............................. | 126/41 R |

* cited by examiner

*Primary Examiner* — Hezron E Williams
*Assistant Examiner* — Paul West
(74) *Attorney, Agent, or Firm* — St. Onge Steward Johnston & Reens LLC

(57) ABSTRACT

A closure device including a fill chamber housing, which forms an edge for a hollow cross-section of a fill chamber, and at least one shut-off valve having a through-passage, the valve being displaceable between an open position and a closed position by a guide gap transversely to a filler chamber longitudinal direction. In the open position, the shut-off valve with the through-passage thereof forms a passage of a fill chamber cross-section, and in the closed position the shut-off valve closes the fill chamber cross-section. A cleaning chamber is formed, the chamber height of which is greater than the gap height of the guide gap, and the position of the chamber is associated with the shut-off valve such that the edge of the through-passage is located in the cleaning chamber in the closed position.

30 Claims, 11 Drawing Sheets

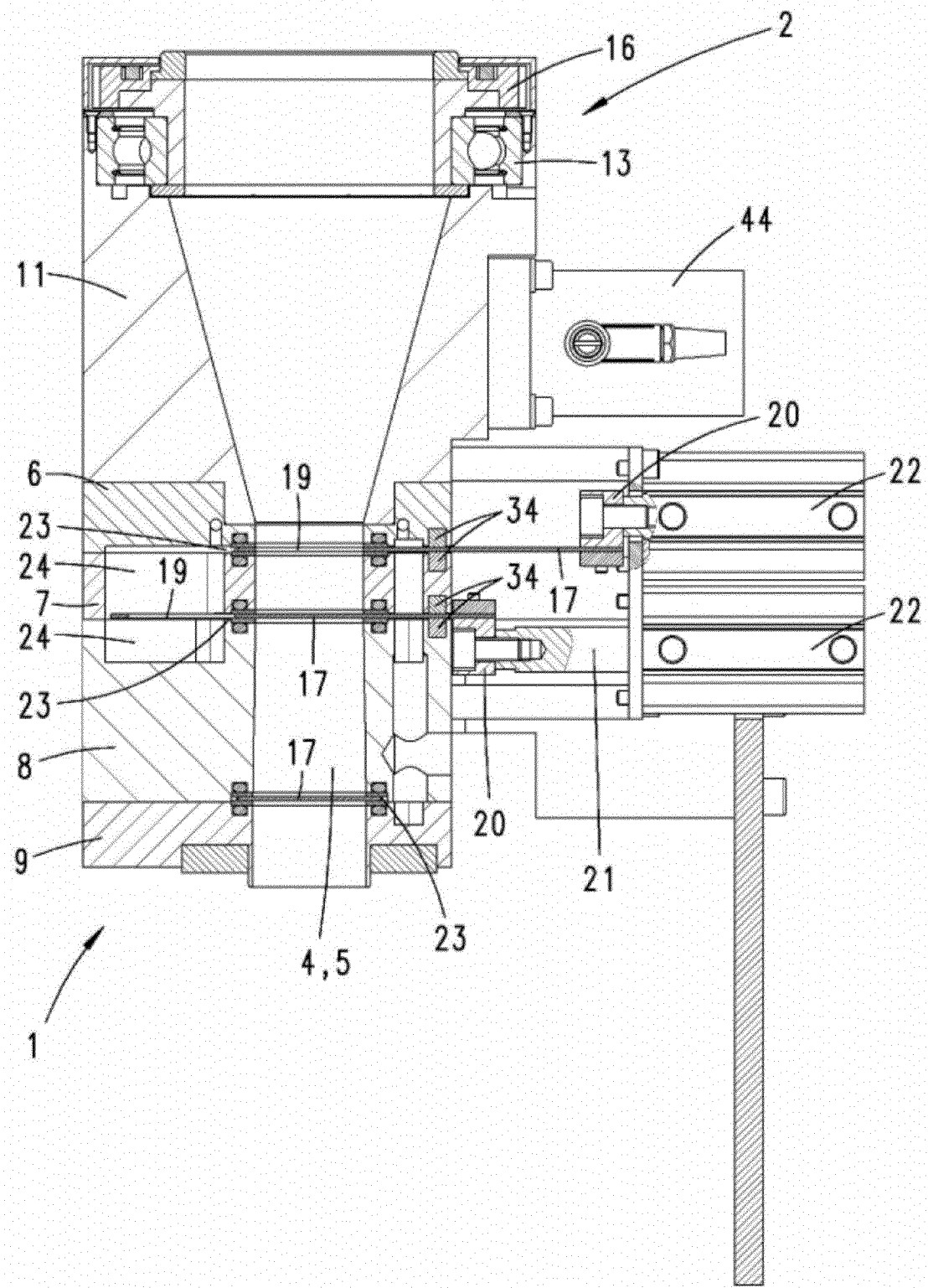

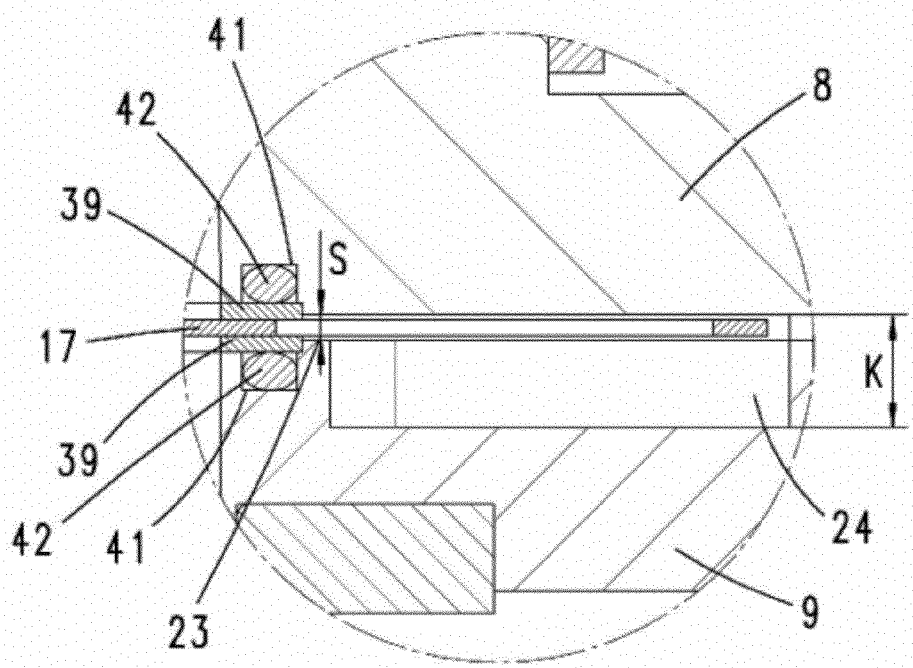
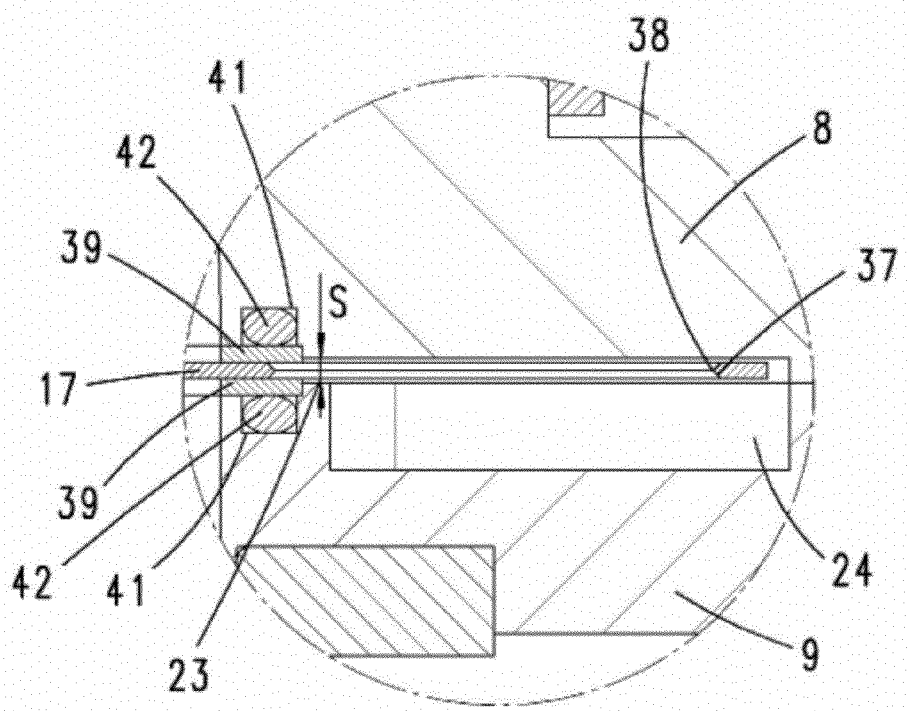

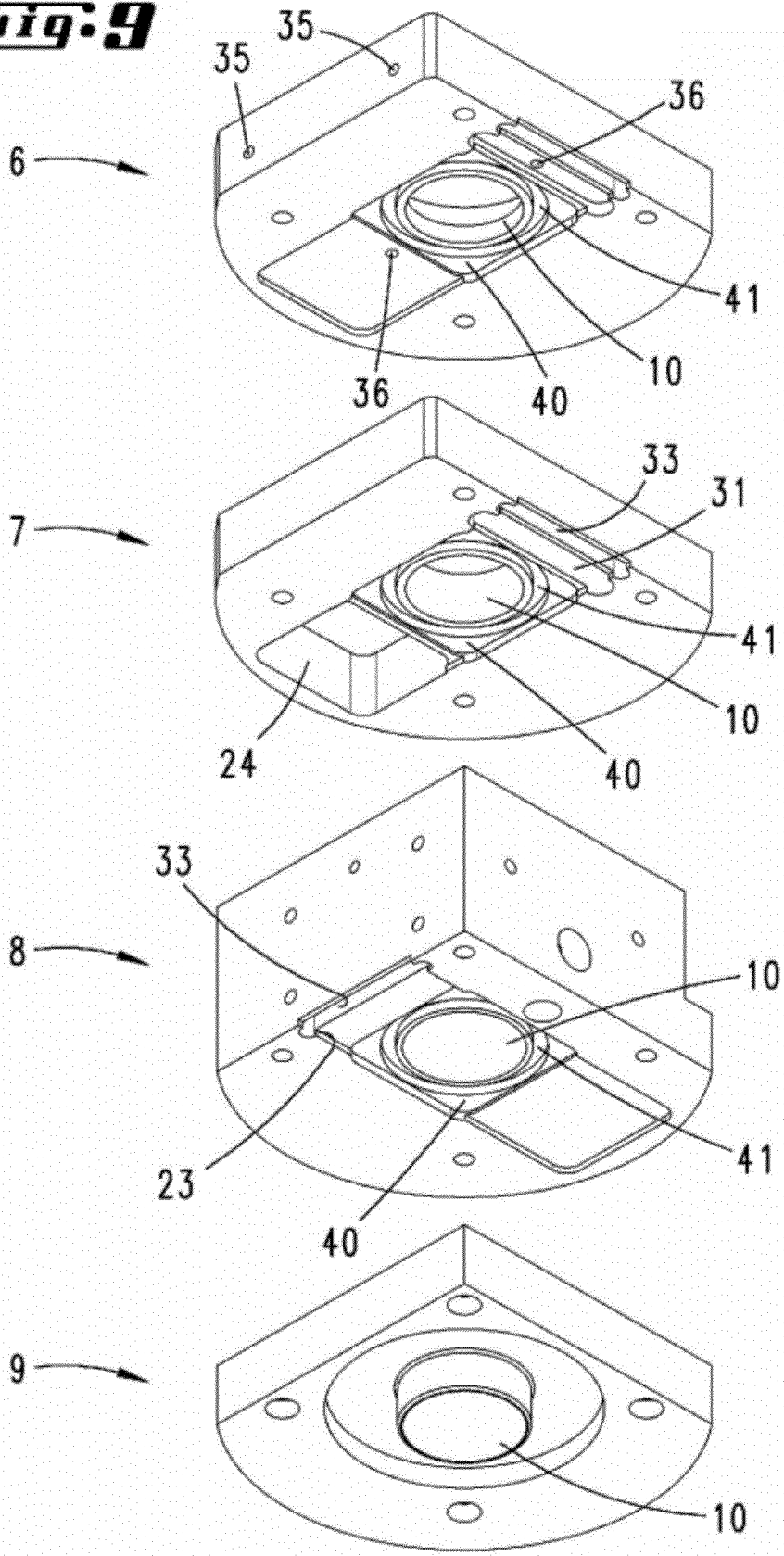

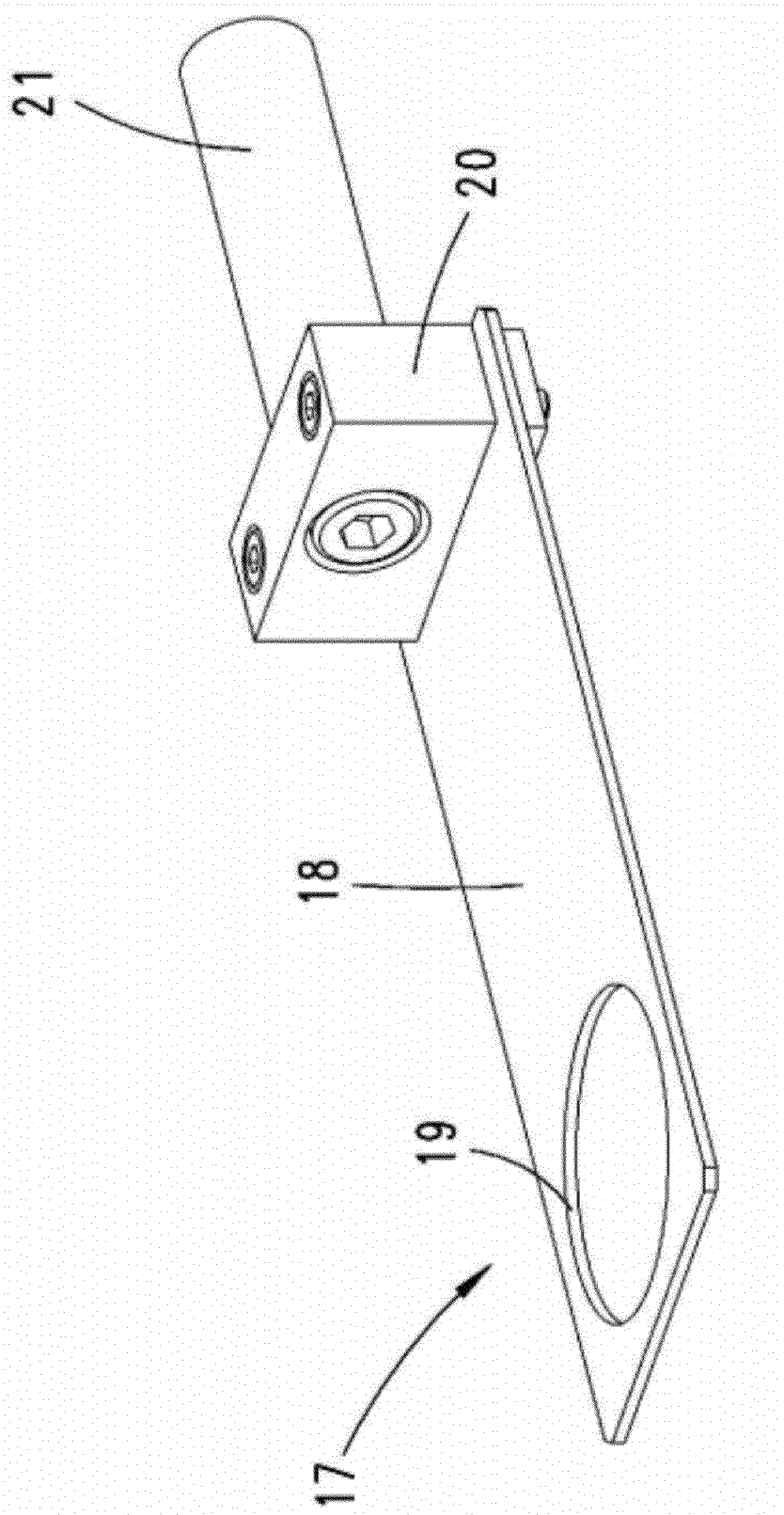

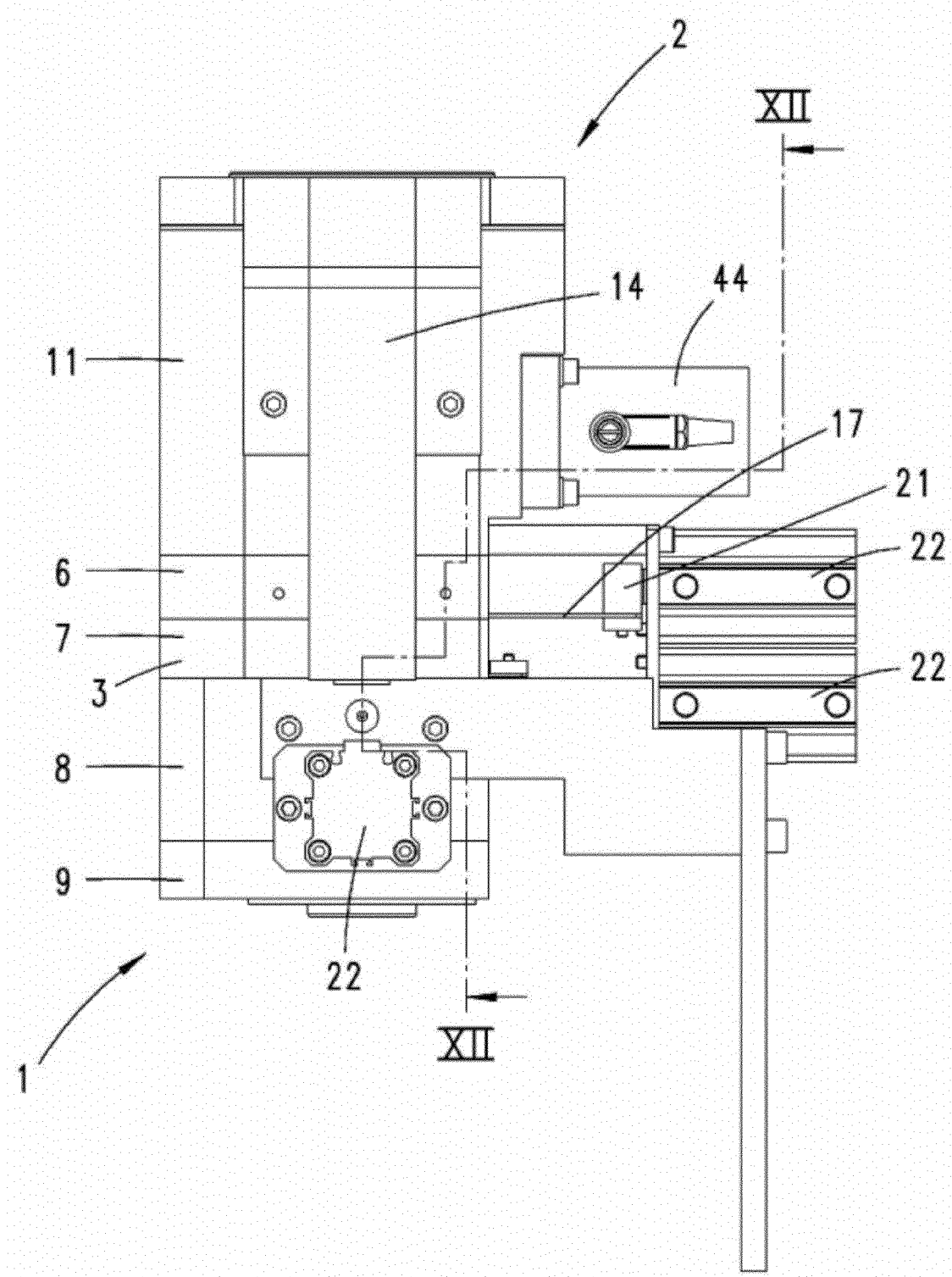

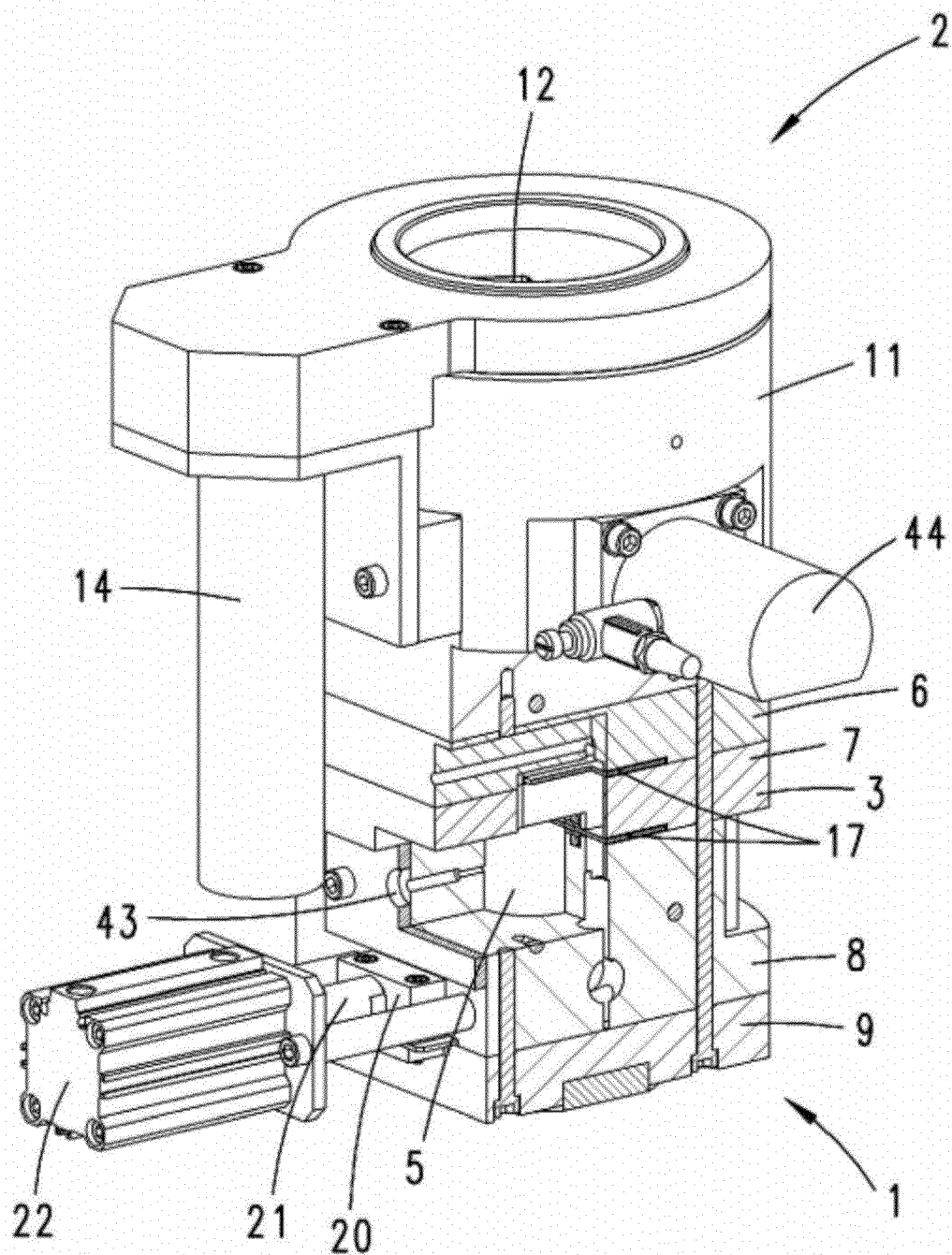

CLOSURE DEVICE AND METHOD FOR OPERATING THE CLOSURE DEVICE

CROSS-REFERENCE TO RELATED APPLICATIONS

The present application is a continuation of pending International patent application PCT/EP2008/051253 filed on Feb. 1, 2008, which designates the United States and claims priority from German Patent Application No. DE 10 2007 005 820.0 filed on Feb. 6, 2007, the content of which is incorporated herein by reference.

FIELD OF THE INVENTION

The present invention relates to a closure device, in particular for a sample-metering unit for metering sample material consisting of free-flowing bulk material, comprising a filling-chamber housing or at least one housing part which delimits a hollow cross-section of a filling chamber, and comprising at least one shut-off valve which has a through-opening and can be displaced in a guidance gap, in a direction transverse to a longitudinal direction of the filling chamber, between an open position and a closed position, the shut-off valve in the open position forming an aperture of a filling-chamber cross-section by way of its through-opening, and the shut-off valve in the closed position closing the filling-chamber cross-section.

BACKGROUND OF THE INVENTION

Such closure devices serve, for example, for the volumetric metering of free-flowing sample material, in order then to test a precisely defined quantity of the sample material for example in respect of composition and properties of the material. Such samples may consist of a wide variety of different materials, among which cement, clinker or for example broken slag may be mentioned merely by way of example. For metering purposes, the procedure is usually such that the free-flowing sample material is introduced in the first instance from above, in excess, into the filling chamber, which is closed initially on the underside for this purpose, and then a shut-off valve disposed at a certain filling-chamber height is pushed through the bulk material introduced, so that a metering chamber which is also closed off in the upward direction is formed in the filling chamber and the metered sample is thus separated off from the excess bulk material. The metering volume here results from the configuration and/or the hollow cross-section of the filling chamber and the spacing of the (upper) shut-off valve from the filling-chamber base. The latter may also be a shut-off valve which such as can be displaced from the closed position into the open position in order for the metered sample to be removed. In order to achieve as precise metering as possible, and to be able to displace the shut-off valve with only a low level of resistance through the bulk material introduced, shut-off valves made of the thinnest possible material, for example made of stainless-steel sheet with a thickness of approximately 1 to 2 mm, have proven successful. On the other hand, in particular thin-walled shut-off valves require guidance in the direction transverse to the displacement direction. In order to make precise metering possible the shut-off valve is accommodated in a longitudinally displaceable manner in a guidance gap in the peripheral region of the filling-chamber hollow cross-section, in particular upstream and downstream of the same, and the height of this gap is dimensioned such that deviations of the shut-off valve from the desired displacement plane are avoided as far as possible. If the shut-off valve is located in the open position, that length portion of the shut-off valve which follows the region with the through-opening, and projects beyond the hollow cross-section, is accommodated in a housing gap. In order to avoid the situation where sample particles (in particular sample dust) adhering to the shut-off valve also pass into the gap, attempts have been made to guide the shut-off valve by way of sealing elements which engage against the same and surround the hollow cross-section. However, this has the difficulty that certain sample materials have an abrasive action and could damage the seals and the shut-off valve over time. If the seals are not exchanged in good time, there is a risk of small quantities of the sample material nevertheless still penetrating into the housing gap. The fact that the sample material or the sample dust can collect there, finally penetrate out of the housing gap, which is open to the outside of the housing, and can also result in contamination outside is not considered to be the only disadvantage here. A further disadvantage, which is even more serious from an application point of view, is that, with sample materials changing, it may also be the case that a subsequent sample is contaminated, and thus impaired, by the previous sample.

With this in mind, it is an object of the invention for a closure device of the type mentioned in the introduction to be developed advantageously so that in particular the abovementioned disadvantages can be avoided as far as possible.

SUMMARY OF THE INVENTION

The object is achieved according to the invention first and foremost in conjunction by the features of forming a cleaning chamber, the height of which is greater than the height of the guidance gap, and which is associated in positional terms with the shut-off valve such that the periphery of the through-opening in the closed position is located in the cleaning chamber. The invention is based on the finding that the periphery of the (for example round) through-opening in the shut-off valve is highly responsible for the abovementioned problems, particles of the sample material which engage against the peripheral edge also passing into the gap and, here, either becoming detached in an uncontrolled manner or, in some cases, remaining in adherence, so that the next metering operation may result in a sample of another material being contaminated. In order to eliminate this problem the invention achieves the situation where the periphery of the through-opening, during each operating cycle of the closure device, in the closed position is automatically located in a cleaning chamber in which cleaning of material residues can take place. In this context, on the one hand passive cleaning is possible. During the period of time in which the periphery of the through-opening or the corresponding length portion of the shut-off valve is located in the cleaning chamber, adhering sample particles can become detached of their own accord over time, or for example also during drying, vibrating action or the like, and are gathered in the cleaning chamber. On the other hand, it is also possible for vibrations to be generated or utilized specifically for this purpose. For example, a so-called beater may be present on the hopper or filling-chamber housing, and this beater makes the hopper vibrate and can be used for shaking off the sample dust. A beater of this kind can also be used in order to help detach sample particles from the shut-off valve in the cleaning chamber. Since the chamber height is greater than the height of the guidance or housing gap, detached particles can collect there without any risk of the detached sample particles immediately coming into contact with the shut-off valve again and returning into the filling chamber. A cleaning chamber provided for passive cleaning can even advantageously be configured such that, with the exception of its connection to the guidance or housing gap, it is closed all the way round during operation of the closure device, so that it is not possible either for any sample particles to escape outward therefrom in an uncontrolled manner. A closeable opening may be provided for the specific removal and disposal of collected sample material at desired intervals (for example following a certain number of separating or metering operations). As an alternative, or in combination, one or more lines may be connected to wall openings of the cleaning chamber in order for sample particles to be channeled away in a specific manner.

It is preferably also possible, as will be explained in more detail hereinbelow, for the cleaning chamber to be provided with devices for active cleaning, preferably using cleaning fluid (for example compressed air) and/or a suction-extraction device.

For an advantageous configuration, the chamber height may be a multiple of, preferably in the range of three to twenty times, the height of the guidance or housing gap. It is also possible for the cleaning chamber to extend beneath and/or above the guidance gap, so that the shut-off valve is exposed therein on its underside and/or upper side. As an alternative, or in combination, the filling chamber may have a plurality of shut-off valves (or closure devices), preferably three shut-off valves, which are spaced apart from one another in the longitudinal direction of the filling chamber. If the longitudinal direction of the filling chamber runs vertically, this results in the preferably three shut-off valves or closure devices being disposed at different heights. For metering purposes, optionally three metering chambers are available in this example, that is to say optionally the metering chamber surrounded by the lowermost and central shut-off valve or the metering chamber surrounded by the lowermost and the uppermost shut-off valve or the metering chamber surrounded by the central and the uppermost shut-off valve, it being possible for the metering chambers to have preferably different volumes. The lower of the two shut-off valves here has the task of forming, in the closed position, a base of the filling chamber and, with the aperture of the open position, an outlet for sample-removal purposes. The upper shut-off valve of the two shut-off valves surrounding a metering chamber in each case has the task of forming an inlet on the upper side in the open position and of performing the metering operation, as a metering valve, during the closing movement through the filling material introduced. As an alternative, it is also conceivable for the base of the filling chamber to be formed in a constructionally different manner. If a plurality of closure devices or shut-off valves are provided in a filling chamber, it is possible for a cleaning chamber to be associated with each of them. The cleaning chambers may be either independent of one another or preferably connected to one another, connection being possible for example by means of cavities, lines or the like extending through the housing.

As far as the active cleaning of the shut-off valve in the cleaning chamber is concerned, there are various possibilities. It is preferred for the cleaning chamber, for this purpose, to be provided with at least one fluid connection. In a first advantageous embodiment, this fluid connection may be connected to a suction-extraction device by means of which the fluid (for example air) located in the chamber can be extracted by means of the negative pressure generated. As a result of the suction-extraction flow, sample particles accumulated on the shut-off valve and, where applicable, on the chamber walls are also extracted by suction and can be transported away by the fluid, which serves as a carrier, e.g. they can be separated off by means of a filter and disposed of. In order to enhance the cleaning performance yet further, the cleaning chamber may have inserts (for example fluid-directing webs) or a shaping assisting the generation of vortices or turbulence. Furthermore, it may be advantageous, in conjunction with suction extraction, for the cleaning chamber, for pressure-equalizing purposes, to have a fluid connection (for example connecting line) to the surroundings, in order for it to be possible to maintain the suction flow over a relatively long period of time. As an alternative, or in combination, the cleaning chamber may have at least one fluid connection which is connected to a feed device for a cleaning fluid, for example for compressed air or conceivably also for a liquid. This also makes it possible for sample particles to be actively removed from the shut-off valve, in particular from the opening periphery thereof, and the chamber walls and, finally, to be removed preferably through an outlet of the cleaning chamber, for example by means of a suction-extraction device. It is advantageously possible for compressed air to be blown into the cleaning chamber from above and for air to be extracted by suction along with the swirled-up sample particles from beneath, although the reverse arrangement would also be possible. A preferred configuration consists in two fluid-outlet openings connected to a feed device for a cleaning fluid, for example for compressed air, being associated with the shut-off valve, one fluid-outlet opening being disposed upstream, and one fluid-outlet opening being disposed downstream, of the hollow cross-section of the filling chamber, as seen in the displacement direction of the shut-off valve, and being directed toward the shut-off valve. If a plurality of shut-off valves or closure devices is provided, and the cleaning chambers thereof are connected to one another, one or more of these cleaning chambers, preferably each cleaning chamber, may have a dedicated fluid connection for feeding cleaning fluid, while the cleaning chambers preferably have a common fluid connection, disposed in the region of the lowermost cleaning chamber, to a suction-extraction device.

A preferred configuration also consists in the cleaning chamber being surrounded by the filling-chamber housing or by one or more housing parts which delimit the filling chamber. This allows a space-saving construction, and the short transporting paths of the sample particles contribute to easy cleaning and removal of the sample dust. As an alternative, it is possible for the cleaning chamber to be disposed, at least in part, outside the filling-chamber housing. For example, it is possible for the filling-chamber housing to be surrounded by an outer housing of a sample-metering unit, with a certain spacing therebetween, and for the cleaning chamber to be provided in the housing interspace.

In order for the risk of sample particles being carried along by the shut-off valve to be reduced further still, it is possible according to a further aspect, which within the context of the invention may be of importance both as a development and on its own account, for the shut-off valve to be provided with a special surface coating. It is thus possible for the shut-off valve to be coated with a non-stick coating, preferably with a nano coating. The so-called lotus-flower effect brought about by such a coating already makes it difficult for sample particles to adhere. As an alternative, or in combination, it is possible for the shut-off valve to be coated with an antistatic coating which is preferably mixed with carbon particles. The resulting electrical conductivity of the surface of the shut-off valve can reduce the attraction to electrostatically charged sample dust. According to yet a further aspect, which likewise may be important as a development or on its own account, it is possible for the peripheral profile of the through-opening of the shut-off valve to taper in the direction of the center of the opening, preferably to form an annular cutting edge. As a result, the sharp peripheral edge of the through-opening as it were cuts through the sample material during closing of the shut-off valve, and this reduces, on the one hand, the closing force and, on the other hand, also the tendency of sample particles to accumulate and be carried along. As an alternative, or in combination, an advantageous development is also possible in that the filling-chamber housing has a plurality of housing parts, the connecting surfaces of which form recesses as a constituent part of cleaning chambers. If such a housing is dismantled for maintenance purposes, this results in direct access to the cleaning chambers.

It is also the case in respect of the filling chamber itself that it is possible for this filling chamber to have at least one fluid connection which opens out preferably in the upper chamber region and is connected to a feed device for a cleaning fluid, in particular for compressed air or a liquid or the like. As an alternative, or in combination, the filling chamber may have at least one fluid connection which opens out preferably in the lower chamber region and is connected to a suction-extraction device. The invention also relates to a sample-metering unit having at least one closure device according to the invention.

The invention further relates to a method of operating a closure device, in particular a sample-metering unit, which can have one or more of the features described above. The invention proposes that a cleaning fluid flows through the cleaning chamber for the removal of sample material following a number, preferably automatically following a certain, for example adjustable, number, of actuations of the shut-off valve, and/or fluid is extracted by suction from the cleaning chamber. A very wide variety of different gases and liquids which can be fed to the cleaning chamber preferably under pressure make suitable cleaning fluids. As a result of the flow, preferably turbulent flow, produced in the cleaning chamber and of the vortices, sample-material particles accumulated on the shut-off valve and the chamber walls are detached by means of the fluid and can be transported away by the same, at the same time, as a carrier medium. It is preferred for compressed air to be used as the cleaning fluid, although other fluids may also be used. Flows which are suitable for cleaning and for transporting away sample-material residues can also be generated for the case where, rather than any pressurized fluid being fed, the air which is present in the cleaning chamber and possibly flows in through equalizing openings is extracted by suction. Instead of discontinuous cleaning, continuous cleaning is also conceivable in that a cleaning fluid, preferably compressed air, flows continuously through the cleaning chamber for the removal of sample material, and/or fluid is continuously extracted by suction from the cleaning chamber. Analogously, it is also possible for a cleaning fluid, preferably compressed air, to flow through the filling chamber for the removal of sample-material residues following emptying of the sample material, and/or for fluid to be extracted by suction from the filling chamber. Compressed air can preferably be blown into the filling chamber from above and extracted by suction from beneath, for example by way of a suction tube.

BRIEF DESCRIPTION OF THE DRAWINGS

The invention will be described in more detail hereinbelow with reference to the accompanying figures, which show preferred exemplary embodiments and in which:

FIG. 5 shows a partial section along line V-V according to FIG. 3, FIG. 6 shows an enlargement of detail VI from FIG. 4, FIG. 7 shows an illustration analogous to FIG. 6, but relating to an alternative embodiment of the shut-off valve, FIG. 9 shows an illustration analogous to FIG. 8, but as seen obliquely from beneath, FIG. 10 shows a perspective view of the shut-off valve according to FIG. 1, FIG. 11 shows a side view of the sample-metering unit as seen in viewing direction XI according to FIG. 1, and FIG. 12 shows, for further clarification, a perspective view with a partial section along section line XII-XII according to FIG. 11.

DETAILED DESCRIPTION OF THE INVENTION

Figure 1:
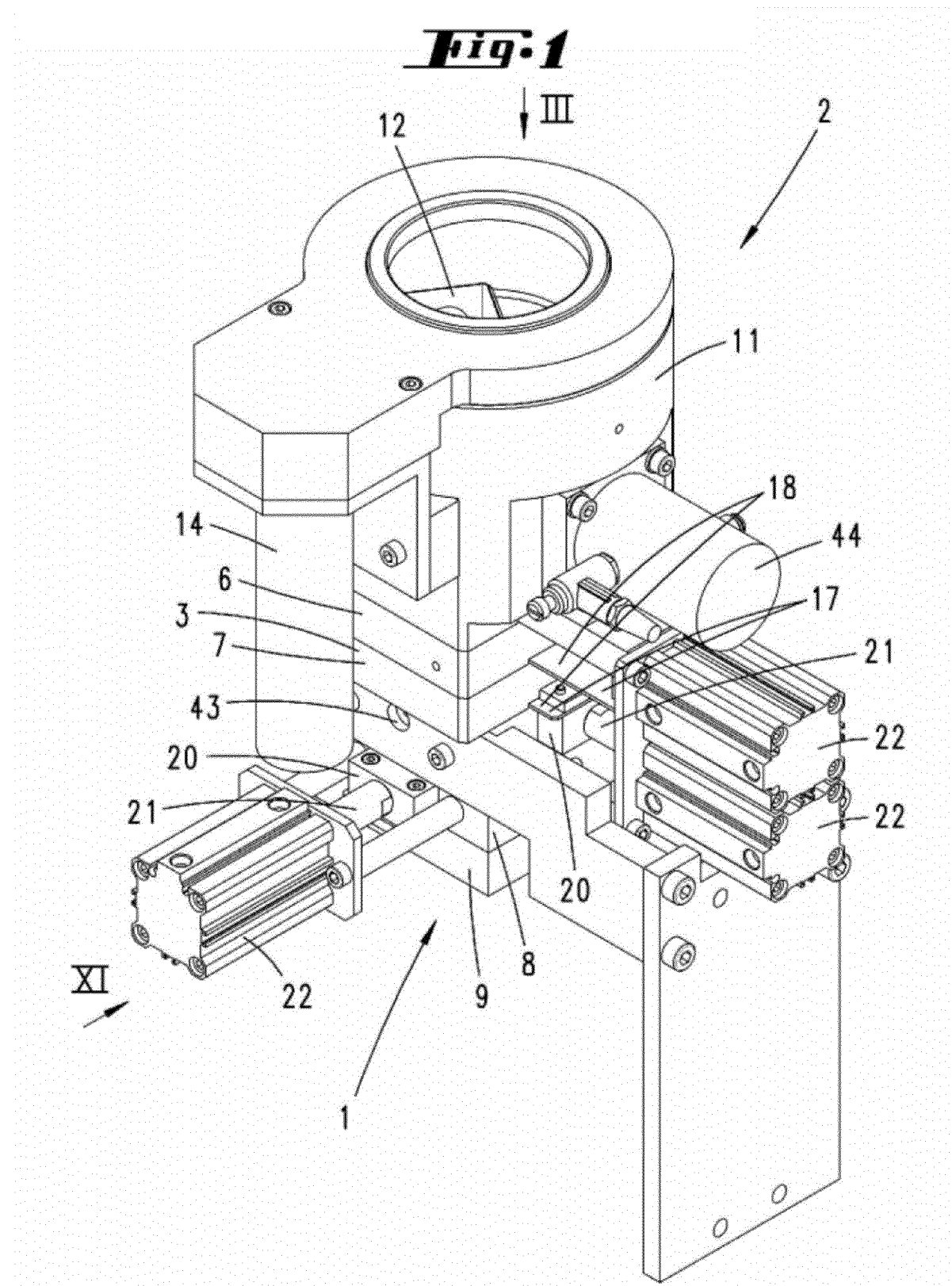
FIG. 1 shows, in perspective, a sample-metering unit with a preferred embodiment of a closure device according to the invention provided thereon.
Figure 2:
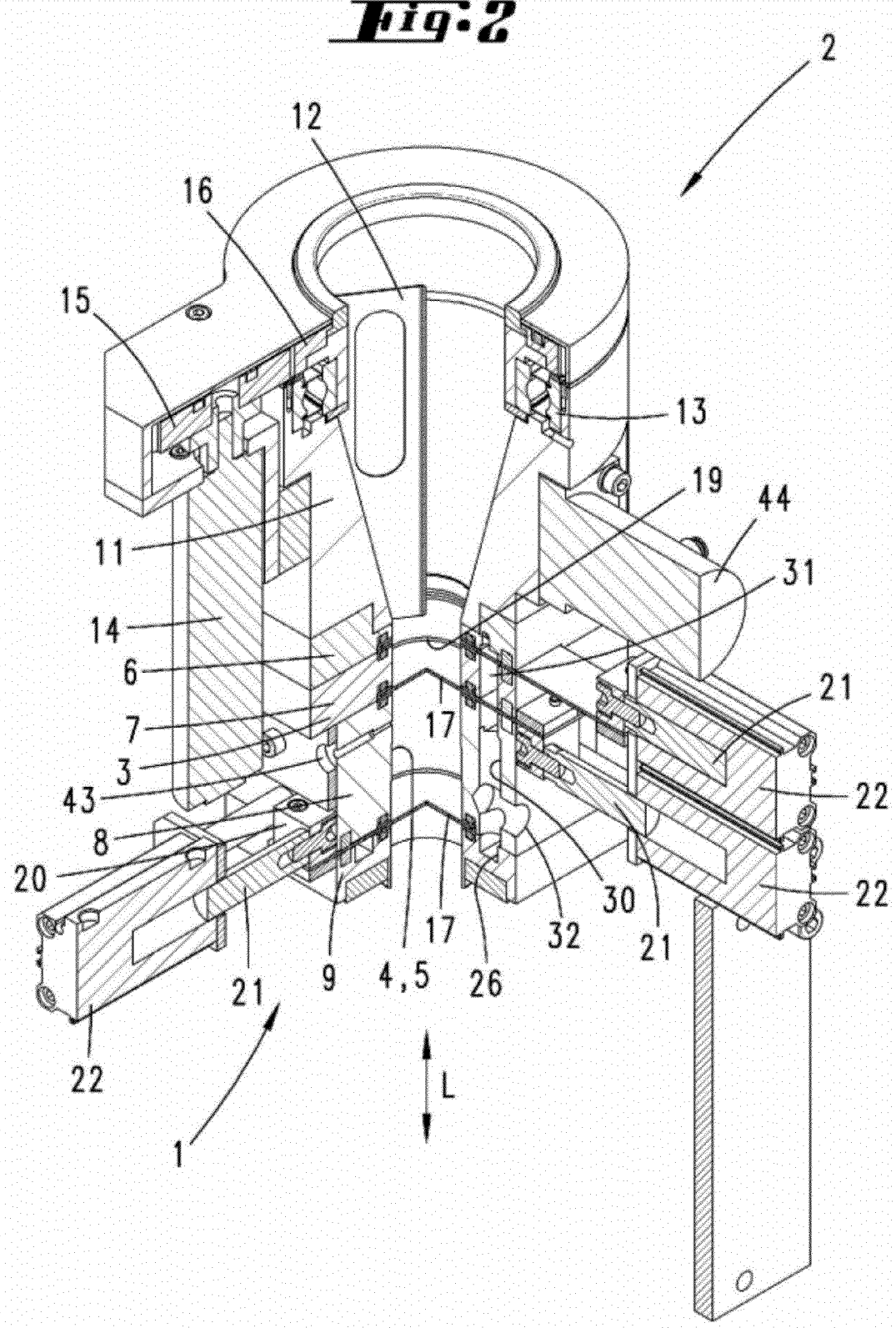
FIG. 2 shows the sample-metering unit which is shown in FIG. 1, having a circumferential housing segment cut out of it in order to illustrate the inner construction.
Figure 3:
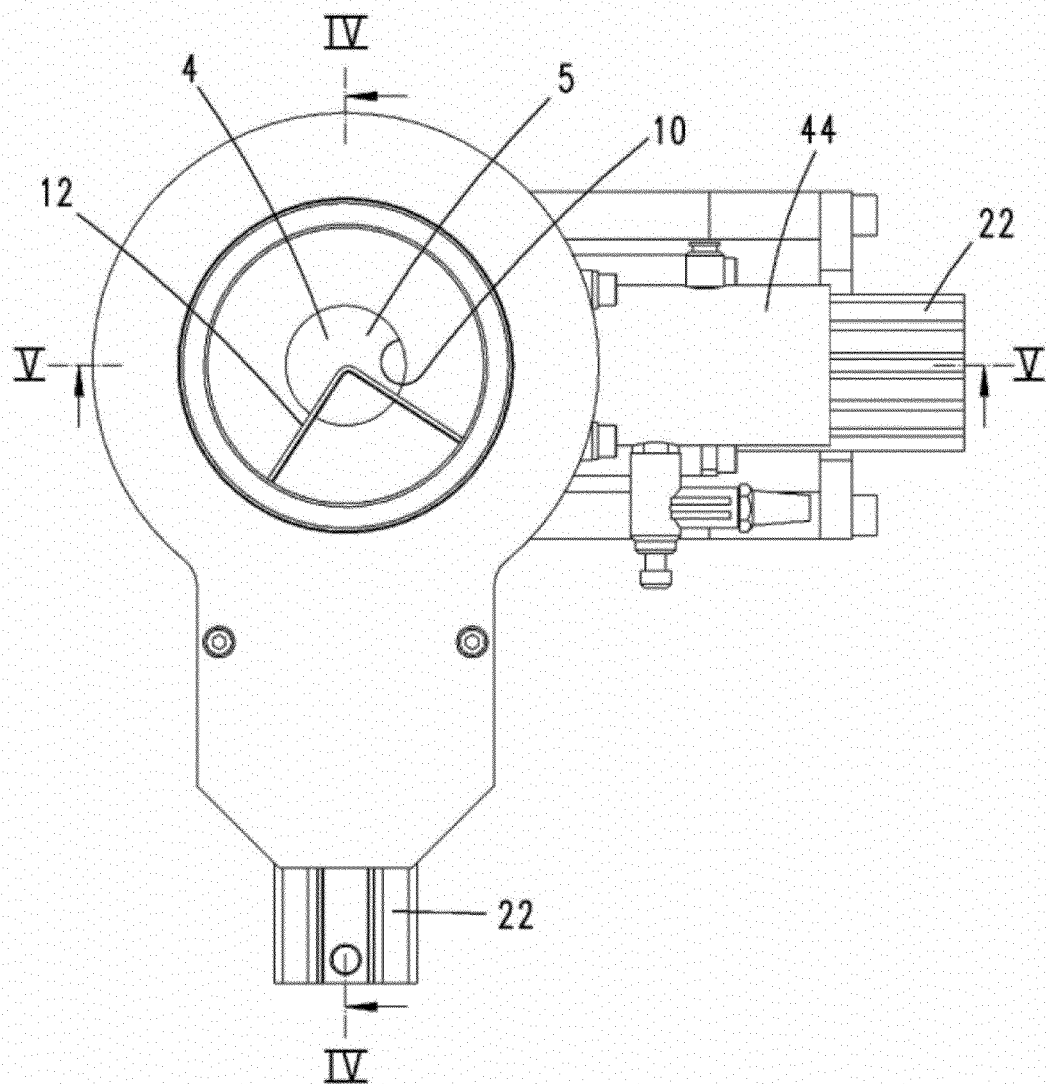
FIG. 3 shows a plan view as seen in viewing direction III according to FIG. 1.
Figure 4:
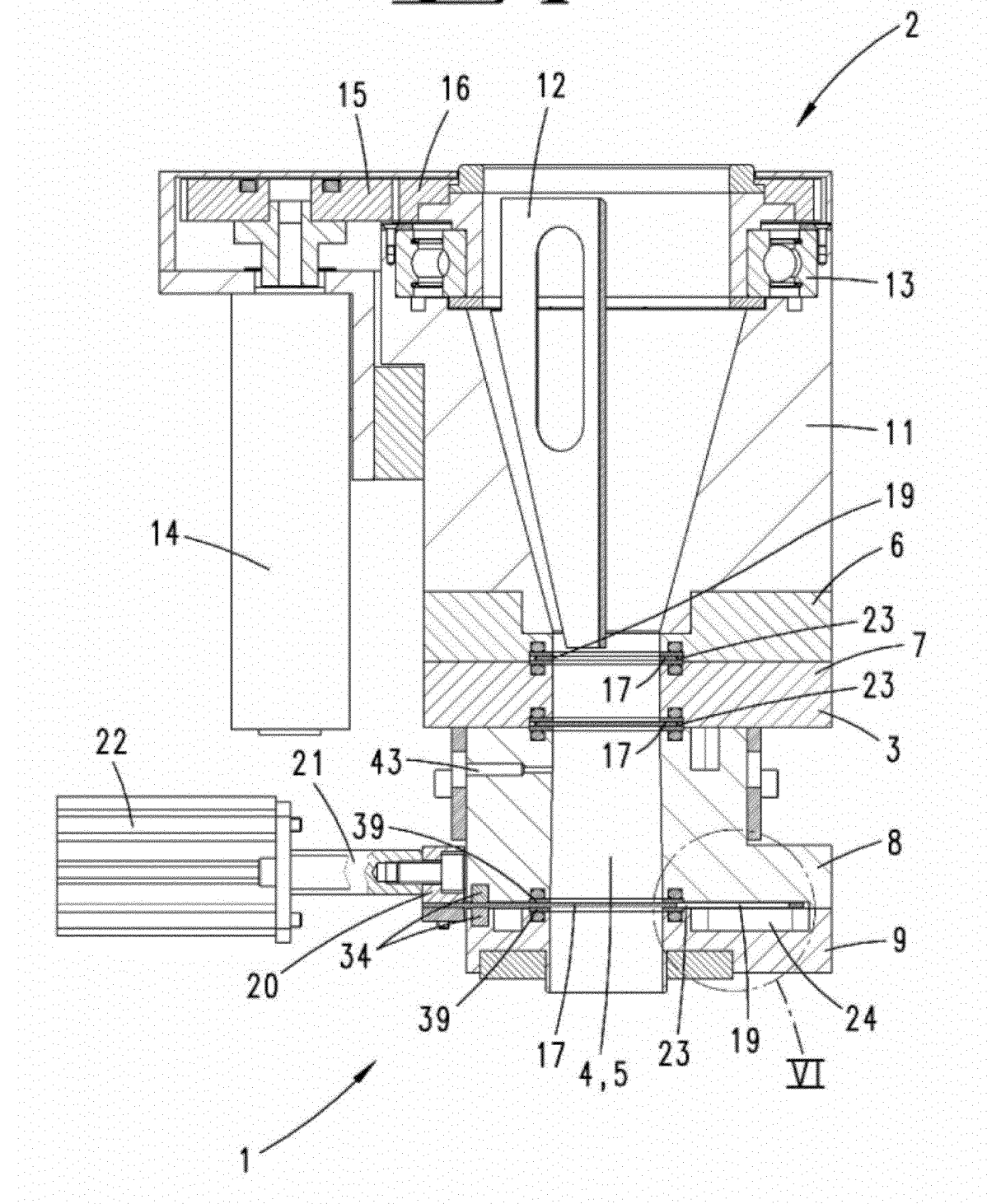
FIG. 4 shows a partial section along line IV-IV according to FIG. 3.
Figure 8:
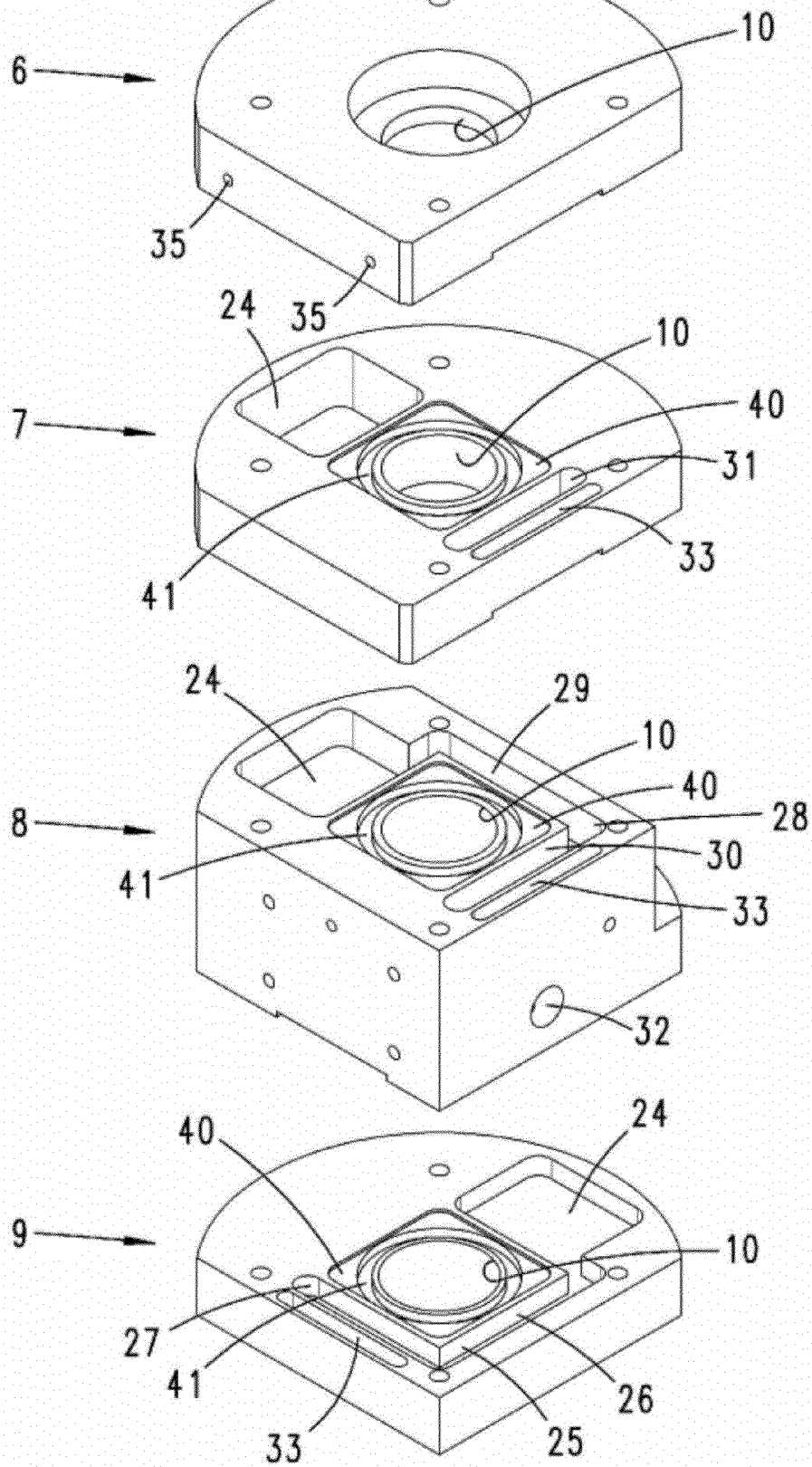
FIG. 8 shows an exploded illustration, in perspective, of a plurality of housing parts of the filling-chamber housing as seen obliquely from above.

FIGS. 1 and 2 show perspective views of a preferred embodiment of the closure device 1 according to the invention as a constituent part of a sample-metering unit 2 according to the invention. This has, in its lower portion, a filling-chamber housing 3 which delimits in its interior a filling chamber 5 which has an, in the example, cylindrical, i.e. a round, hollow cross-section 4 and the longitudinal direction L of which extends vertically. As FIGS. 8 and 9 also illustrate, the filling-chamber housing 3, in the example selected, has a plurality of slab-like housing parts 6, 7, 8 and 9 which, in respect of their round, approximately central through-openings 10, which delimit the filling chamber, are screw-connected in alignment with one another (cf. FIG. 12 in this respect). A downwardly tapering filling hopper 11 is mounted on the uppermost housing part 6. A stirrer 12 which is shaped in the manner of an L profile in cross-section is installed in a rotatable manner into this filling hopper by means of a ball bearing 13. The stirrer 12 can be motor-driven in rotation by means of a motor 14, which is also illustrated schematically in FIG. 2 and the pinion 15 of which engages in a toothed ring 16 connected to the stirrer 12. In the exemplary embodiment selected, the closure device 1 has three slide-gate valves 17 which are spaced apart from one another along the longitudinal direction L of the filling chamber, i.e. are disposed at different heights, the spacing between the two upper shut-off valves being smaller than the spacing between the two lower shut-off valves. As FIG. 10 indicates, the shut-off valve 17 has an elongate, in particular rectangular slide-gate valve plate 18 (in the example selected a stainless-steel sheet of 1.5 millimeters in thickness) which, in its front length portion, has a through-opening 19, which in the example selected (albeit not necessarily) is circular. At the opposite or rear longitudinal end, the valve plate is clamped in a screw-connection mounting device 20 which, for its part, is fixedly connected to a piston rod 21. A respective piston 21 is accommodated in a longitudinally displaceable manner at its end in a respective pressure cylinder 22, which is fitted to the filling-chamber housing 3 from the outside. The piston/cylinder unit can be used to displace each shut-off valve 17 in a guidance gap 23 (cf. FIGS. 4-7) in the filling-chamber housing, in a direction transverse to the longitudinal direction L of the filling chamber, between a rear, open position and a front, closed position, as seen in the displacement direction from the cylinder 22. In the example selected, the through-opening 19 of the shut-off valve 17 has the same diameter as the opening 10 of the housing parts 6-9 and, in the open position, is aligned with the opening 10, so that a stepless aperture is formed. This open position is illustrated for example in FIGS. 2 and 5 for the upper shut-off valve 17. In the closed position, which is illustrated in the figures merely by way of example for the two lower shut-off valves 17, the piston 21 has been extended out of the cylinder 22, so that the closed length portion of the valve plate extending between the through-opening 19 and the screw clamp 20 completely closes the hollow cross-section 4 of the filling chamber. Of course, instead of the piston/cylinder units, alternative drives, for example electric motors, would also be suitable for displacing the shut-off valve 17. It can also be seen in particular from FIGS. 2 and 3 that, in the example selected (i.e. not a necessity), the two upper shut-off valves can be displaced in the same direction, while the lowermost shut-off valves 17 can be displaced in a direction which is orthogonal thereto. As FIGS. 4-6 show, each shut-off valve 17 has associated with it, according to the invention, a cleaning chamber 24 which follows the guidance or housing gap 23 and the height K of which is a multiple of the gap height S. Each cleaning chamber 24 is associated in positional terms with its shut-off valve 17 such that the periphery of the through-opening 19 in the closed position is located within the cleaning chamber 24. Full details of the configuration of the cleaning chambers 24 can be gathered from FIGS. 8 and 9 in conjunction with FIGS. 2 and 5. It can be seen from FIG. 8 that, in the plane of housing part 9, the lower cleaning chamber 24 forms a groove-like L-shaped extension 25 with two legs 26, 27. In the housing part 8, the cleaning chamber 24 forms, with the legs 29, 30, a groove-like L-shaped extension 28 which is rotationally offset through 90° with respect to the L-shaped extension 25. In the housing part 7, the cleaning chamber 24 is formed as a through-opening, rather than as a recess, and, on the opposite side of the opening 10, a further, slot-like through-opening 31 is provided. It is also the case that the leg 30 in component 8 (in contrast to the leg 29) is a vertically running through-opening. As is clear in conjunction with FIGS. 2 and 5, the leg 30, or the narrow, vertically running through-opening thereof, is connected to a fluid connection 32 through which a fluid can be channeled. The fluid connection 32 is illustrated, for reasons of simplicity, as a bore and serves for connection to a suction-extraction device (not represented in the drawings) by which fluid can be extracted by the generation of a negative pressure. Furthermore, the leg 30, or the corresponding through-opening, changes, on the upper side, into the opening 31 and, on the underside, into the leg 26. It is also the case that those large-surface-area regions of the cleaning chambers 24 in the housing parts 7, 8 which serve for accommodating the opening-periphery regions of the shut-off valves 17 in the closed position adjoin one another without any walls. This means that the three cleaning chambers 24 associated with the shut-off valves 17 are all connected to one another by means of cavities. Accordingly, the fluid connection 32 can be used in order to extract fluid, preferably the enclosed air, by suction centrally from all the cleaning chambers 24. It also follows from that configuration of the cleaning chambers 24 which has been explained that the flow which serves for cleaning the shut-off valve and chamber walls does not just act in those regions of the chambers 24 in which is located the periphery of the through-opening 18 in the closed position. Rather, it is also the case that the cleaning-chamber regions which are formed by the legs 27, 30 and 31 and are located on the opposite housing side in relation to the openings 10, i.e. between the filling chamber 5 and the pairs of stripping elements 34 inserted into slots 33, constitute cleaning regions. The strippers 34, in the example selected, are polyurethane moldings. FIGS. 8 and 9 indicate that, in the exemplary embodiment selected, the housing part 6, which is adjacent to the uppermost shut-off valve 17, has two lateral fluid connections 35, each line-connected to a respective fluid-outlet opening 36 on the underside of housing part 6. The fluid connections 35, which in order to simplify matters are shown only as bores, are connected, in a manner which is not illustrated, to a feed device for a cleaning fluid, for compressed air in the example selected. The compressed air can be blown, through a respective outlet opening 36, into those parts of the cleaning chamber 24 which are located upstream and downstream of the filling chamber, as seen in the displacement direction. Since the three cleaning chambers 24, in the example selected, are connected to one another, the compressed air fed through the connections 35 can be distributed between all the chambers and gather up sample-material dust adhering to the chambers and to the three shut-off valves, in order then to be extracted by suction through the fluid connection 32 and disposed of.

FIG. 7 uses an enlarged detail to show a further advantageous variant of the shut-off valve 17. Accordingly, the peripheral profile 37 of the through-opening 18 of the shut-off valve 17 tapers in the direction of the center of the through-opening, this resulting in an annular cutting edge 38 with cutting-edge flanks which, in the example shown, are beveled at equal angles.

FIGS. 4-9 show that a respective pair of flat seals 39 are associated with each of the shut-off valves 17, for upper and lower engagement against the same. These flat seals may be, for example, glass-fiber seals or seals made of other materials, for example also so-called hybrid seals made of different materials in order also to extend the service life in relation to abrasive media. Also suitable are seals made of glass-fiber-reinforced plastic, in particular of glass-fiber-reinforced epoxy resin or glass-fiber-reinforced polyester resin, or for example seals made of laminated sheet material. In the exemplary embodiment selected in the figures, the flat seals 39 have a round central opening, the diameter of which corresponds to that of the opening 10, and they are formed continuously along the circumference of the opening. The quadrilateral outer contour is adapted, in the example, to the square periphery of recesses 40 provided for accommodating purposes in the housing parts 6-9. In the exemplary embodiment shown, a respective O-ring 42, which is inserted into an annular groove 41 and is made of elastic material, serves for pressing the flat seals 39 against the shut-off valve 17. As an alternative to the O-rings, it would also be possible to use foamed or sealed adapters made of foam rubber, polyurethane moldings or the like. In the case of the exemplary embodiment described in relation to the figures, the cleaning chambers 24 of the shut-off valves 17 are connected to one another for fluid flow, as described, although the two upper, parallel shut-off valves can be displaced at right angles to the lower shut-off valve. Of course, the shut-off valves may also be oriented in other ways and/or have differing displacement directions (for example all in the same direction). It also falls within the framework of the invention that only some of the plurality of cleaning chambers are connected to one another, or that there is no connection between the cleaning chambers. In particular in the latter case, any desired cleaning chamber may be provided with a separate fluid connection for feeding cleaning fluid and/or with a separate fluid connection to a suction-extraction device.

FIGS. 1, 2 and 4 show that, in the example, it is also the case that the filling chamber 5 has a fluid connection 43 which opens out beneath the central shut-off valve 17 and is connected to a feed device (not illustrated) for a cleaning fluid, or for compressed air in this example. As an alternative, this fluid connection could serve for the connection of a suction-extraction device, or a plurality of separate fluid connections could be provided.

The construction selected in the figures makes it possible for three metering chambers of different sizes to be realized by the three shut-off valves 17 for metering free-flowing bulk material. If the lowermost shut-off valve serves as an openable metering-chamber base, the central shut-off valve can be used for metering a comparatively small sample quantity, while the uppermost shut-off valve can alternatively be used for metering a larger sample quantity. As an alternative, it is possible for the central shut-off valve 17 to form the metering-chamber base and for the uppermost shut-off valve to serve for metering a, comparatively, extremely small sample quantity. The unit 44 which is shown in FIGS. 1-3 and 12, and is fitted on the hopper or on the filling-chamber housing, is a so-called beater. This makes the hopper vibrate and serves for shaking off the sample dust, but can also be used to help detach sample material from the shut-off valve within the cleaning chamber 24.

All features disclosed are (in themselves) pertinent to the invention. The disclosure content of the associated/attached priority documents (copy of the prior application) is hereby also included in full in the disclosure of the application, also for the purpose of incorporating features of these documents in claims of the present application.

What is claimed is:

1. A closure device, in particular for a sample-metering unit for metering sample material consisting of free-flowing bulk material, comprising a filling-chamber housing or at least one housing part which delimits a hollow cross-section of a filling chamber, and comprising at least one shut-off valve which has a through-opening and can be displaced through a guidance gap, in a direction transverse to a longitudinal direction of the filling chamber, between an open position and a closed position, the shut-off valve in the open position forming an aperture of a filling-chamber cross-section by way of its through-opening, and the shut-off valve in the closed position closing the filling-chamber cross-section, a cleaning chamber being formed, the height of which is greater than the height of the guidance gap, and which is associated in positional terms with the shut-off valve such that the periphery of the through-opening in the closed position is located in the cleaning chamber,
    characterized in that a plurality of shut-off valves are spaced apart along the filling chamber, and in that a respective cleaning chamber is associated with each of the plurality of shut-off valves, and characterized in that all the cleaning chambers are connected to one another.

2. The closure device according to claim 1, characterized in that the height of each respective cleaning chamber is three to twenty times the height of the guidance gap.

3. The closure device according to claim 1, characterized in that the each respective cleaning chamber extends beneath and/or above the its associated shut-off valve.

4. The closure device according to claim 1, characterized in that at least one cleaning chamber is provided with at least one fluid connection.

5. The closure device according to claim 1, characterized in that each respective cleaning chamber has at least one fluid connection which is connected to a suction-extraction device.

6. The closure device according to claim 1, characterized in that each respective cleaning chamber has at least one fluid connection which is connected to a feed device for a cleaning fluid.

7. The closure device according to claim 6, wherein said cleaning fluid is compressed air.

8. The closure device according to claim 1, characterized in that a plurality of cleaning chambers are connected to one another, one or more of these cleaning chambers having at least one dedicated fluid connection for feeding cleaning fluid, and in that the interconnected cleaning chambers have at least one common fluid connection, disposed in particular in the region of the lowermost cleaning chamber, to a suction-extraction device.

9. The closure device according to claim 8, characterized in that, through each of the two fluid-outlet openings, compressed air can be blown into respective parts of each respective cleaning chamber which are located upstream and downstream of the filling chamber, as seen in the displacement direction of each shut-off valve.

10. The closure device according to claim 1, characterized in that each respective cleaning chamber is surrounded by the filling-chamber housing or by filling-chamber housing parts.

11. The closure device according to claim 1, characterized in that each respective cleaning chamber is disposed, at least in part, outside the filling-chamber housing or filling-chamber housing parts.

12. The closure device according to claim 1, characterized in that each shut-off valve is coated with a non-stick coating.

13. The closure device according to claim 12, wherein said non-stick coating is a nano coating.

14. The closure device according to claim 1, characterized in that each shut-off valve is coated with an antistatic coating which has carbon particles.

15. The closure device according to claim 1, characterized in that the peripheral profile of the through-opening of each shut-off valve tapers in the direction of the center of the opening to form an annular cutting edge.

16. The closure device according to claim 1, characterized in that the filling-chamber housing has a plurality of housing parts, and in that the closure device comprises one or more housing parts, the connecting surfaces of which form recesses for forming cleaning chambers.

17. The closure device according to claim 1, characterized in that the filling chamber has at least one fluid connection which opens out in particular in the upper chamber region and is connected to a feed device for a cleaning fluid.

18. The closure device according to claim 17, wherein said cleaning fluid is compressed air.

19. The closure device according to claim 1, characterized in that the filling chamber has at least one fluid connection which opens out in particular in the lower chamber region and is connected to a suction-extraction device.

20. The closure device according to claim 1, characterized in that each respective cleaning chamber has parts which are located upstream and downstream of the filling chamber, as seen in the displacement direction of each shut-off valve.

21. The closure device according to claim 1, characterized in that each respective cleaning chamber has a region in which is located the periphery of the through-opening of each shut-off valve in the closed position, and also has a groove-like L-shaped extension with two legs, one leg of which is located on the housing side which is located opposite the abovementioned region with respect to an opening which delimits the filling chamber.

22. A sample-metering unit having at least one closure device according to claim 1.

23. The closure device according to claim 1, characterized in that the cleaning fluid is compressed air.

24. The closure device according to claim 1, characterized in that two fluid-outlet openings connected to a feed device for a cleaning fluid are associated with the shut-off valve, one fluid-outlet opening being disposed upstream, and one fluid-outlet opening being disposed downstream, of the hollow cross-section of the filling chamber, as seen in the displacement direction of the valve.

25. A method of operating a closure device, in particular a sample-metering unit having at least one closure device, comprising the steps of:
   feeding a cleaning fluid through an uppermost cleaning chamber of a plurality of cleaning chambers of a cleaning chamber housing;
   feeding the cleaning fluid through the remaining of the plurality of cleaning chambers;
   removing sample material particles accumulated on at least one shut-off valve and on cleaning chamber walls after a number of actuations of the-at least one shut-off valve which has a through-opening and can be displaced through a guidance gap, in a direction transverse to a longitudinal direction of a filling chamber, between an open position and a closed position, the shut-off valve in the open position forming an aperture of the filling-chamber cross-section by way of its through-opening, and the shut-off valve in the closed position closing the filling-chamber cross-section, each of the plurality of cleaning chambers being formed, the height of which is greater than the height of the guidance gap, and which is associated in positional terms with the shut-off valve such that the periphery of the through-opening in the closed position is located in each of the cleaning chambers;
   characterized in that fluid is continuously extracted by suction from a lower most cleaning chamber.

26. The method according to claim 25, characterized in that a cleaning fluid flows through the filling chamber for the removal of sample-material residues following emptying of the sample material, and/or fluid is extracted by suction from the filling chamber.

27. The method according to claim 26, wherein the cleaning fluid is compressed air.

28. The method according to claim 25, characterized in that use is made of a closure device.

29. The method according to claim 28, wherein said closure device is used as a sample-metering unit.

30. The method according to claim 25, characterized in that the cleaning fluid is compressed air.

* * * * *